Figure 1:
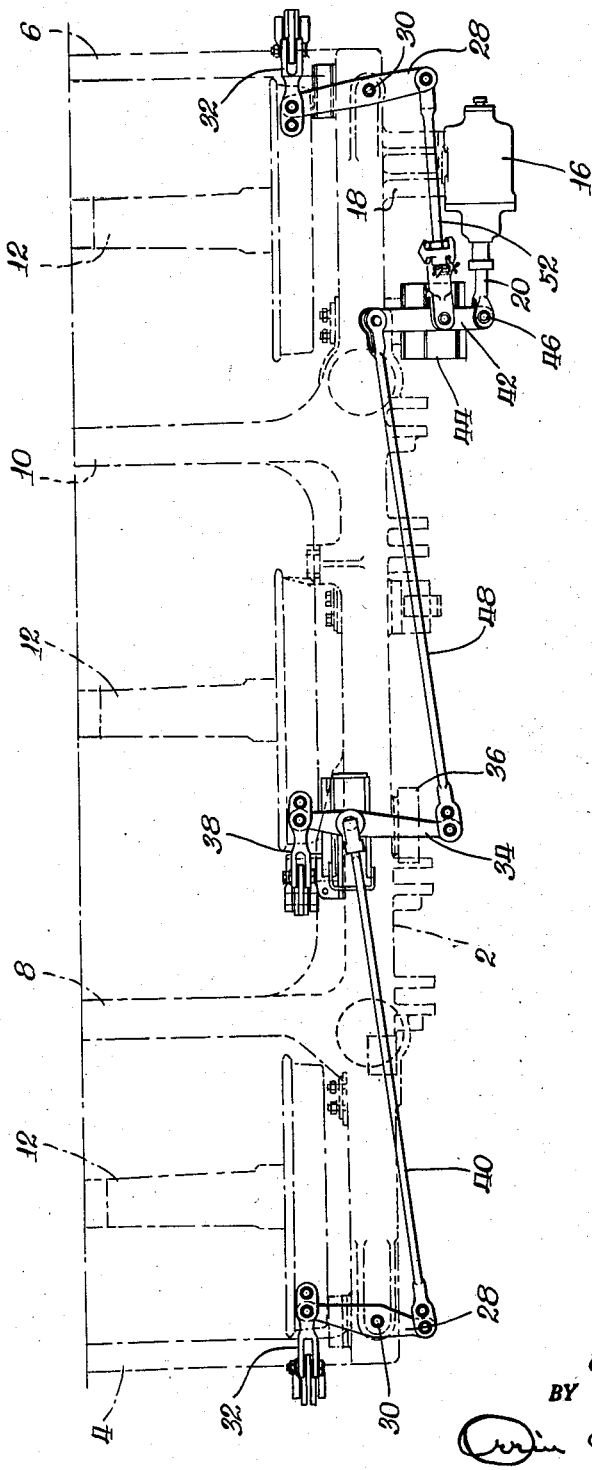

July 22, 1958 C. E. TACK 2,844,221
TREAD BRAKE ARRANGEMENT
Filed Jan. 5, 1954 2 Sheets-Sheet 1

INVENTOR.
Carl E. Tack
BY

July 22, 1958　　　　　C. E. TACK　　　　　2,844,221
TREAD BRAKE ARRANGEMENT
Filed Jan. 5, 1954　　　　　　　　　　　　2 Sheets-Sheet 2
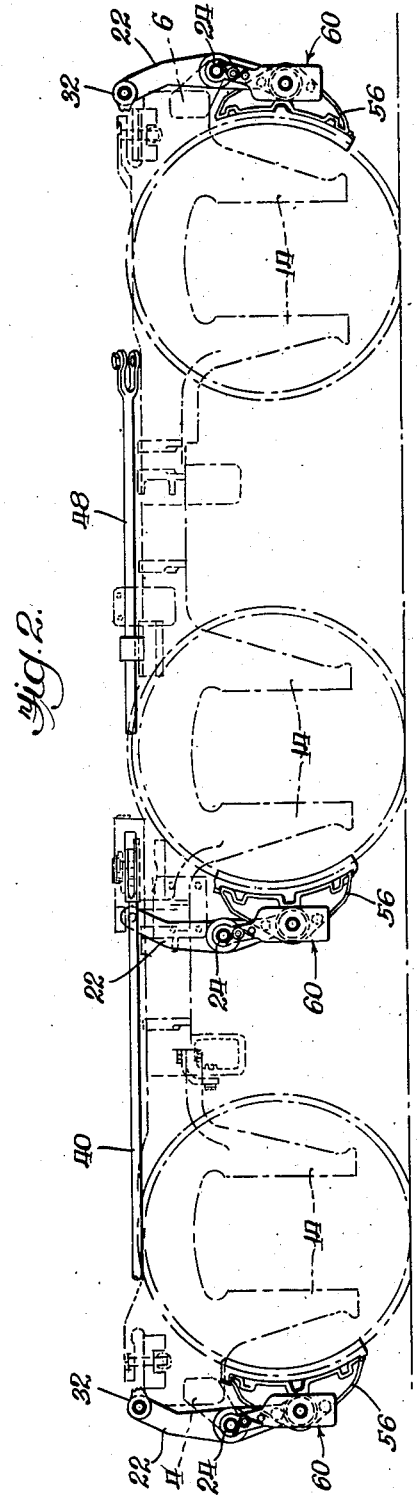
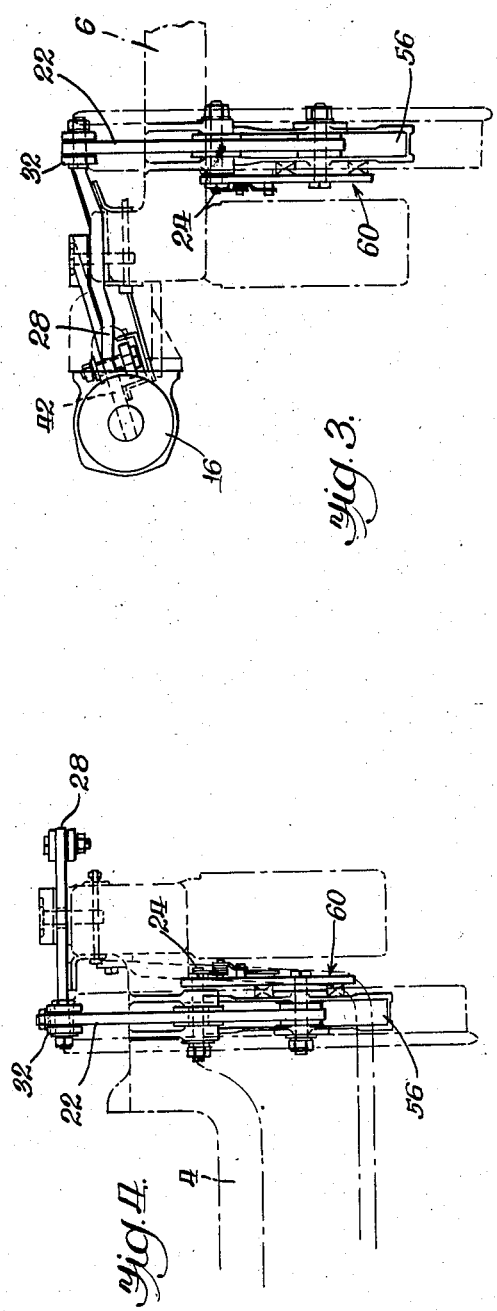
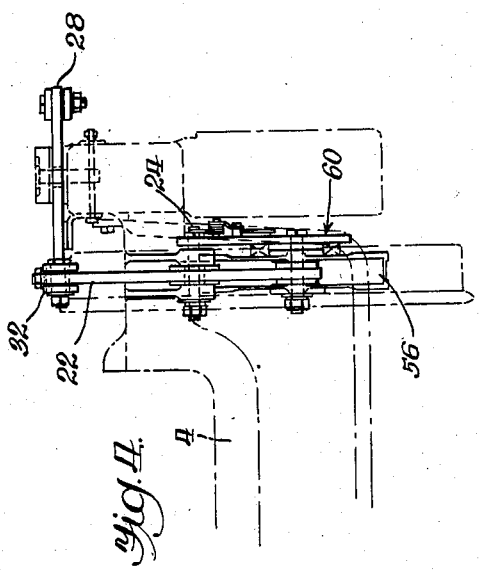
INVENTOR.
Carl E. Tack
BY
O. B. Farmer
Atty.

United States Patent Office 2,844,221
Patented July 22, 1958

2,844,221

TREAD BRAKE ARRANGEMENT

Carl E. Tack, Chicago, Ill., assignor to American Steel Foundries, Chicago, Ill., a corporation of New Jersey Application January 5, 1954, Serial No. 402,261

9 Claims. (Cl. 188—46)

The invention relates to a railway brake and more particularly to a type of brake rigging commonly associated with the tread of railway truck wheels.

It is a general object of the invention to provide a novel brake rigging and wheel tread brake for a six wheel railway car truck.

It is a further object of the invention to provide a wheel tread brake of the type described actuable by a single actuating power source of each side of the truck.

Additionally it is an object of the invention to provide a wheel brake rigging of the type described wherein the number of parts are reduced to a minimum and so located on the truck to afford maximum room for other equipment such as a rotor brake on the frame and axle or motors and generators. Improved clearances of this nature have special utility in passenger car trucks.

It is another object of the invention to provide a linkage arrangement that assures positive equal pressure brake application on each wheel on one side of the truck.

These and other objects of the invention will become apparent from the examination of the specification and the associated drawings, wherein:

Figure 1 is a fragmentary top plan view of one half of a railway car truck embodying the invention, Figure 2 is a fragmentary side elevational view of the structure shown in Figure 1, Figure 3 is an end elevational view taken from the right as seen in Figures 1 and 2, and Figure 4 is an end elevational view taken from the left of the structure shown in Figures 1 and 2.

In the embodiment of the invention shown, the truck frame comprises a side member 2, end rails 4 and 6 at opposite ends of the truck, and spaced transoms 8 and 10 interconnecting the side rails 2 intermediate the ends of the frame. A plurality of wheel and axle assemblies 12 resiliently support the frame in the conventional manner (not shown). The frame additionally presents depending pedestal jaws 14, 14 adjacent the ends of each wheel and axle assembly 12, said depending jaws movably receiving journal boxes (not shown) in the conventional manner.

A main power source or actuating cylinder 16 is supported by the truck frame. The cylinder is rigidly secured to a bracket 18, which may be attached to or formed integrally with the side member 2 adjacent one end of the truck. The power source or actuating cylinder 16 is actuable in the conventional manner and, when actuated, causes a piston rod 20 to be moved horizontally toward the opposite end of the truck.

A novel brake rigging is provided and consists of a plurality of brake levers 22 pivotally fulcrumed intermediate the ends thereof to the frame as at 24. It will be noted that each wheel of the three wheel and axle assemblies illustrated has a single brake lever 22 mounted on the frame adjacent thereto, the brake levers 22 at the opposite ends of the truck being pivotally mounted from the end rails 4 on the outboard ends of the truck.

The brake rigging further comprises a dead lever 28 mounted at each end of the truck and pivoted thereto intermediate its ends as at 30, said dead levers 28 being preferably pivotally movable in a horizontal plane. The inboard ends of the dead levers 28 are operatively link or clevis connected as at 32 to the upper ends of the related brake levers 22. A live lever 34 is carried by the truck adjacent the left-hand end thereof. The frame 2 has a bracket 36 to support said live lever 34 under the action hereinafter described. The inboard end of the live lever 34 is operatively link or clevis connected as at 38 to the upper end of the brake lever 22 which is mounted adjacent the central wheel and axle assembly 12. A pull rod 40 has its opposite ends pivotally connected to the outboard end of the left dead lever 28 and to an intermediate portion of the live lever 34, respectively. Another live lever 42 is movably carried by a frame mounted bracket 44 adjacent the right-hand end of the truck. The live lever 42 has its outboard end pivotally connected as at 46 to the extremity of the piston rod 20. The inboard end of the live lever 42 is pivotally connected to the outboard extremity of the live lever 34 by means of pull rod 48. Another adjustable pull rod 52 has its opposite ends pivotally connected to the outboard end of the right-hand dead lever 28 and to an intermediate portion of the live lever 42, respectively.

Brake head-brake shoe assemblies 56 are pivotally carried on the lower extremities of the brake levers 22 adjacent the tread of each wheel of the related wheel and axle assembly 12. As is well understood in the art, the brake shoes of said assemblies 56 engage the tread of the adjacent wheel upon actuation of the brake levers whereby the moving truck is decelerated. Associated with the connection between each brake lever 22 and the related brake head-brake shoe assembly 56 is a brake head balancing device indicated generally at 60. Each balancing device 60 is operative to maintain the related brake head-brake shoe assembly 56 in proper relation to the tread of the related adjacent engaged wheel to ensure proper engagement therewith during brake actuation and to prevent any dragging of the brake shoe on the wheel during periods of brake release.

In operation, and assuming the parts to be in released position, actuation of the power means 16 moves the piston rod 20 to the left as seen in the figures. The leftward movement of the piston rod causes a clockwise rotation of the live lever 42 which in turn moves the pull rod 52 to the left inducing clockwise rotation of the connected dead lever 28 about its fulcrum 30. Clockwise rotation of the right-hand dead lever 28 induces clockwise rotation of the connected live lever 22 as seen in Figure 2, whereby the carried brake head-brake shoe assembly 56 is urged to engage the tread of the wheel of the right-hand wheel and axle assembly 12. The clockwise rotative movement of the live lever 42 additionally urges the pull rod 48 to move to the right, said movements inducing the counterclockwise rotative movement in the connected live lever 34. The counterclockwise movement of the live lever 34 induces a counterclockwise movement of the centrally located brake lever 22 about its pivot 24, as seen in Figure 2, which again urges the carried brake head-brake shoe assembly 56 into engagement with the tread of the wheel on the center wheel and axle assembly 12. Additionally, the counterclockwise movement of the live lever 34 causes the connected pull rod 40 to move to the right which in turn induces a counterclockwise motion in the left-hand dead lever 28, likewise causing a counterclockwise motion about the pivot 24 in the connected brake lever 22. The carried brake head-brake shoe assembly 56 is urged to engage the tread of the wheel of the left-hand wheel and axle assembly 12. Release of the power means 16 causes the parts to move in reverse direction to those thus described whereby the entire braking mechanism is released. It will be readily apparent to those skilled in the art that the various parts of the brake rigging operate substantially in unison so that the brake shoes are supplied to the related wheel virtually simultaneously.

I claim:

1. In a brake rigging for a railway car truck, three spaced wheel and axle assemblies, a frame supported thereby, brake levers fulcrumed to the frame at opposite ends thereof outboardly of the adjacent assemblies, another brake lever fulcrumed to the frame adjacent the center assembly, all of said brake levers carrying brake shoes on the lower ends thereof engageable with the treads of the related wheels, an actuating cylinder having a piston rod, a pair of dead levers fulcrumed to the frame intermediate their ends, said dead levers having their inboard ends connected respectively to the first mentioned brake levers, a pair of live levers, adjacent respective dead levers, a plurality of pull rods, each pull rod interconnecting one live lever with its most adjacent dead lever, a connection between one of said live levers and said other brake lever, an operative connection between the piston rod and the other of said live levers and an operative connection between the live levers.

2. A brake rigging for a railway car truck according to claim 1, wherein the dead levers are located at opposite ends of the truck and have their inboard ends connected directly to the related brake levers.

3. A brake rigging for a railway car truck according to claim 2, wherein each pull rod connects the outboard end of the related dead lever to a portion intermediate the ends of the related live lever.

4. In a brake rigging for a six wheel railway car truck, a frame, three supporting wheel and axle assemblies, brake rigging on one side of the truck comprising an actuating cylinder mounted on one end of the truck on the outboard side thereof, said actuating cylinder having a movable piston rod, a live lever having its outboard end connected to the piston rod, a pair of dead levers at opposite ends of the truck, another live lever carried intermediate the ends of the truck, pull rods interconnecting the outboard ends of the dead levers with intermediate portions of the live levers, another pull rod interconnecting extremities of the live levers, and means operatively connected to the rigging to engage the wheels of said assemblies.

5. A brake wheel rigging for a six wheel railway car truck according to claim 4, wherein said means includes brake levers fulcrumed intermediate their ends to the frame and disposed adjacent the respective assemblies, said brake levers carrying brake shoe assemblies on the lower ends thereof engageable with the related wheels, and direct connections between the inboard ends of the dead levers and certain of said brake levers, and another direct connection between the inboard end of one of the live levers and another of said brake levers.

6. In a railway car truck, a frame, supporting wheel and axle assemblies, power means on the frame adjacent one corner thereof, braking means on the wheels at one side of the truck comprising brake levers carrying brake shoes adjacent respective wheels, dead levers each having one end connected to a related brake lever, a pair of live levers intermediate said dead levers, a pull rod interconnecting an end of one live lever with an end of the other live lever, said one live lever having its other end connected to the power means, said other live lever having its other end connected to its related brake lever, and pull rods interconnecting the ends opposite the mentioned ends of the dead levers with intermediate portions of respective live levers.

7. In a railway car truck, a plurality of supporting wheel and axle assemblies, brake levers supported by the frame, brake shoes carried on the lower ends of the levers, actuating levers disposed entirely above the level of the brake shoes, certain of said actuating levers being a pair of dead actuating levers located adjacent respective ends of the frame and fulcrumed intermediate their ends to the frame, another of said actuating levers being located intermediate the dead levers and supported by the frame, power means adjacent one end of the frame and supported thereby, a live actuating lever connected at its outboard end to the power means, a pull rod connecting said live actuating lever at its inboard end to said other of said actuating levers at its outboard end, another pull rod connecting an intermediate portion of said live actuating lever to one of said dead actuating levers at its outboard end, and another pull rod connecting the other of said dead actuating levers at its outboard end to said other of said actuating levers intermediate its ends, said brake levers being operatively connected to the dead levers, respectively, at their inboard ends.

8. In a railway car truck, a plurality of supporting wheel and axle assemblies, brake means on one side of the truck comprising four actuating levers extending generally transversely thereof, power means connected to the outboard end of one actuating lever, a pull rod connecting the inboard end of said one actuating lever to another actuating lever at its outboard end, a pull rod connecting said other lever at a point intermediate its ends to the outboard end of a third actuating lever, a pull rod connecting the first mentioned lever intermediate its ends to the outboard end of a fourth actuating lever, and friction means operatively connected to certain of the four actuating levers.

9. In a brake mechanism for a railway car truck, a plurality of supporting wheel and axle assemblies, brake shoes operatively carried by the truck, a plurality of actuating levers disposed above the brake shoes, power means connected to one of said actuating levers, the inboard end of said one lever being connected by a pull bar to the outboard end of a second actuating lever, said second lever being connected intermediate its ends by a pull bar to the outboard end of a third actuating lever fulcrumed intermediate its ends to the end of the frame remote from said one lever, and brake means operatively connected to the second and third actuating levers.

References Cited in the file of this patent
UNITED STATES PATENTS

| | | |
|---|---|---|
| 1,998,976 | Baselt | Apr. 23, 1935 |
| 2,077,662 | Baselt | Apr. 20, 1937 |
| 2,238,744 | Mueller | Apr. 15, 1941 |
| 2,402,389 | Gantner | June 18, 1946 |
| 2,418,435 | Tack | Apr. 1, 1947 |
| 2,471,313 | Crossman | May 24, 1949 |